United States Patent Office 3,674,480
Patented July 4, 1972

3,674,480

PHOTOGRAPHIC DRY COPYING PROCESS

Helmut Kampfer, Cologne, Anita von Konig, Erwin Ranz, Harald von Rintelen, and Dietmar Mayer, Leverkusen, and Klaus Sasse, Cologne, Germany, assignors to Agfa-Gevaert Aktiengesellschaft, Leverkusen, Germany No Drawing. Filed Apr. 28, 1970, Ser. No. 32,726
Claims priority, application Germany, May 24, 1969, P 19 26 655.8
Int. Cl. G03c 5/54, 1/52
U.S. Cl. 96—29 20 Claims

ABSTRACT OF THE DISCLOSURE

Photographic prints can be produced by imagewise exposure of a light-sensitive layer containing a transferable image producing compound and a light-sensitive compound capable of reacting upon exposure with an image producing compound to yield a non-transferable reaction product. The exposed layer is heated and contacted with an image receiving layer containing compounds capable of reacting with the heat transferred image producing compound to form the image dye.

The light-sensitive compound is an organic azide compound and the image producing transferable compound a compound of the pyrazolidone-3-series.

The invention relates to a photographic dry copying process for making reproductions of both black-and-white and colored graphic originals and to a light-sensitive material for carrying out this process.

It is known that certain organic azides are light-sensitive, e.g. organic azides which are used for the photocross-linking of polymers. In addition, organic azides which on exposure decompose into products which in turn react with other compounds, such as phenothiazine, to yield dyes or which enable oxidative coupling reactions to be carried out by the principle of chromogenic development in color photography, have been described.

The known light-sensitive materials of the type mentioned above which can be used for producing negative copies, have however numerous disadvantages. For example, their sensitivity to light is unsatisfactory particularly in the visible region of the spectrum, so that unduly long copying times are necessary and the reproduction of colored originals give rise to difficulties. In addition, the final images remain sensitive to light, and they can only be stabilized against day-light by a very complicated after-treatment.

Furthermore, processes for the production of copies are known in which the copies are produced by the imagewise exposure of a light-sensitive layer which contains a light-sensitive compound and an image producing compound which can be transferred to an image receiving layer, the image producing compound in the exposed areas being converted into a non-transferable compound, and the exposed layer being brought into contact with an image receiving layer, which contains compounds which react with the image producing compound to form colored compounds, the layers which are in contact being heated to a temperature at which the image producing compound is transferred from the unexposed areas of the light-sensitive layer to the image receiving layer.

This process includes, e.g. the so-called heat development process in which light-sensitive materials, which include a silver halide emulsion layer and which contain a photographic developer, are used. After exposure, development is carried out by heating in contact with an image receiving layer which contains materials which yield dyes by reaction with the developer. The developer is transferred from the unexposed areas of the light-sensitive layer to the image receiving layer at elevated temperature, a colored image being produced in these areas of the receiving layer.

One disadvantage of these known heat development or developer sublimation processes is that the silver halide emulsion layers which contain developer are insufficiently stable in storage, this instability being due to these layers containing materials which increase the residual moisture of the layers, such as salts which for hydrates, or glycols, and being due to the increased sensitivity to oxidation of most of the developer materials in these weak or unhardened emulsion layers, which have a high residual moisture content.

The process which is described in U.S. Pat. No. 3,094,417 also belongs to this type of copying process. In the process according to the said patent specification, the light-sensitive layers which are used contain a volatile compound and a dye. On exposure, the volatile compound is converted into a non-volatile product. On subsequent heating, this compound can be transferred from the unexposed areas to a receiving material where it reacts with a silver salt (silver behenate) to form a colored positive image.

The last mentioned process is disadvantageous since the light-sensitivity of the layers is comparatively low.

It is among the objects of the present invention to provide a photographic dry copying process and light-sensitive materials suitable for this process, which have sufficient sensitivity to light and which enable multicolored and black-and-white images to be produced.

We now have found a process for the production of copies by imagewise exposure of a light-sensitive layer which contains a light-sensitive compound and an image producing compound which is transferable to an image receiving layer, the image producing compound in the exposed areas being converted into a non-transferable compound, the exposed layer being brought into contact with an image receiving layer which contains compounds which react with the image producing compound to form colored compounds, and the layers in contact being heated to a temperature at which the image producing compound is transfered from the unexposed areas of the light-sensitive layer to the image receving layer, wherein the light-sensitive layer used contains as a light-sensitive compound an organic azide, and as an image producing, transferable compound, a compound of the pyrazolidone-(3) series which is transferable at a temperature between 80 and 200° C.

Azides suitable for the light-sensitive layer are light-sensitive aryl azides or heterocyclic azides which contain at least one azido group, and in which the azido group is attached to the aromatic ring either directly or via a carbonyl or sulfonyl group. The light-sensitive azido compounds may be monomers or polymers. The choice of light-sensitive azido compounds will depend on the requirements of the particular reproduction process. The most suitable azides for a particular process can easily be found by tests customarily employed in the art.

Heterocyclic azides of the following general formula have been found to be particularly suitable:

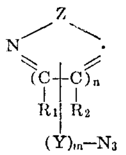

wherein represents:

Z=the ring members necessary for completing a 5- or 6-membered N-containing heterocyclic ring, e.g. an oxazole, thiazole, selenazole, imidazole, pyridine, pyrrole or pyrimidine ring, which ring may contain a fused ring of the phenyl or naphthyl series;

Y=arylene, preferably a phenylene ring, or a phenylene-carbonyl methylene group, the phenylene ring may contain further substituents such as alkyl or alkoxy, both preferably containing up to 3 carbon atoms, hydroxyl, halogen such as chlorine or bromine, etc.;

$R_1$ or $R_2$=hydrogen, a saturated or an olefinically unsaturated aliphatic group containing preferably up to 5 carbon atoms, aryl, especially a ring of the phenyl series, amino which may be substituted with alkyl or acyl, halogen such as chlorine or bromine, hydroxyl, alkoxy containing preferably up to 5 carbon atoms, and carboxyl or esterified carboxyl, especially carboxyl which has been esterified with aliphatic alcohols, or carbamoyl, sulfo, sulfonamido or nitril;

$R_1$ and $R_2$ may represent the ring members required for completing a fused benzene or naphthalene ring;

$m$=0 or 1; and $n$=0 or 1.

Light-sensitive compounds of the 9-azido-2,3-benzoacridine, 4-azidoquinoline or 9-azidoacridine series are especially suitable. These compounds all have the same basic structure. They differ from each other merely by a fused benzene ring. Substitution products of these basic compounds may also be used, e.g. those which are substituted alkyl, preferably with alkyl containing up to 6 carbon atoms such as methyl, ethyl, propyl or butyl, alkoxy also preferably containing 6 carbon atoms, amino, mono- or di-alkylamino, the alkyl groups of which also preferably containing up to 6 carbon atoms, halogen such as chlorine or bromine, or nitro, nitrile; carboxyl or esterified carboxyl.

Phenyl or naphthyl azides or carbonyl or sulfonyl azides are also especially suitable. Arylazides of the type in which two phenyl or naphthyl rings are joined together by one or more vinylene groups, e.g. stilben-azides, have been found to be particularly suitable. In these compounds, the chain formed by the vinylene groups may also be interrupted by carbonyl groups.

Suitable azides are summarised in the following table:

TABLE 1

(1) p-Methoxybenzenesulfazide
(2) fluorenone-2,7-disulfazide (decomposition 161–162° C.)
(3) 2,3-diazidonaphthoquinone-(1,4)
(4) 2,4-diazido-6-methylpyrimidine
(5) 2-azidobenzoxazole
(6) 2-azidobenzothiazole
(7) 2-azidomethylene-3-ethylrhodanine (M.P. 108–109° C.)
(8) 2-azidomethylene-3-phenylrhodanine (M.P. 119–121° C.)
(9) 4-azidoquinoline
(10) 4-azidoquinaldine
(11) 2-methyl-3-phenyl-4-azidoquinoline
(12) 4-azido-7-nitroquinoline
(13) 2-methyl-4-azido-7-dimethylaminoquinoline
(14) 9-azidoacridine
(15) 2-chloro-9-azidoacridine
(16) 2-methoxy-6-chloro-9-azidoacridine
(17) 2-methyl-9-azidoacridine
(18) 2-nitro-9-azidoacridine
(19) 3-dimethylamino-9-azidoacridine
(20) 9-azido-2,3-benzoacridine
(21) 9-azido-3,4-benzoacridine
(22) 9-azido-4-carbamoylacridine (decomposition 230° C.)
(23) 9-azido-2-carbethoxyaminoacridine (M.P. 172° C.)
(24) 9-azido-1,2,3,4-tetrahydroacridine
(25) 2,6-diphenyl-4-azidopyrimidine
(26) 1,4-bis-[2-(4-azidobenzoyl)-vinyl]-benzene
(27) bis-[4-azidostyryl]-ketone
(28) 2,5-bis-[4-azidobenzylidene]-cyclopentanone
(29) 2,5-bis-[4-azidobenzylidene]-2,5-dihydrothiophene-S-dioxide
(30) 2,6-bis-[3-azidobenzylidene]-cyclohexanone (M.P. 80–85° C.)
(31) [3-azidostyryl]-[4-azidophenyl]-ketone (M.P. 86–88° C.)
(32) 4-azidocinnamic acid anilide
(33) 1,6-bis-[4-azidophenyl]-hexatriene-(1,3,5)
(34) 4-azidobenzophenone
(35) 2,6-bis-[4-azido-γ-chlorocinnamylidene]-cyclohexanone (decomposition 140–148° C.)
(36) 1,2-bis-[4-azidobenzoyl]-ethylene (decomposition 136° C.)
(37) 2,6-bis-[4-azidobenzylidene]-cyclohexanone
(38) 2-[4-azidobenzoylmethylene]-α-naphthothiazole.
(39) 2-p-toluenesulfamido-9-azidoacridine
(40) 2-benzoylamino-9-azidoacridine.

The above azides are prepared by known methods; compounds 1 to 25 and 39, 40 e.g. are prepared by reacting the corresponding halogen compounds with sodium azide, and compounds 26 to 38 are prepared by condensation of aldehydes with active methylene compounds. Another useful process for their preparation is the Sandmeyer reaction.

Suitable image producing compounds are reducing pyrazolidone-(3) derivatives which are transferable in the temperature range of between 80 and 200° C., includes those represented by the following formula:

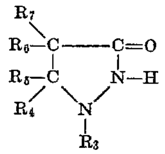

in which $R_3$ represents hydrogen, alkyl having preferably up to 5 carbon atoms or aryl, in particular phenyl or naphthyl which may be substituted, e.g. with lower alkyl or alkoxy both having preferably up to 3 carbon atoms or halogen; and $R_4$, $R_5$, $R_6$ and $R_7$ represent hydrogen, alkyl, having preferably up to 5 carbon atoms or aryl preferably a ring of the phenyl or naphthyl series, wherein the alkyl or aryl group may be substituted as referred under $R_3$.

Particular utility is exhibited by the compounds shown in the following table:

TABLE 2

1-phenyl-3-pyrazolidone
1-m-tolyl-3-pyrazolidone
1-p-tolyl-3-pyrazolidone
1-phenyl-4-methyl-3-pyrazolidone
1-phenyl-5-methyl-3-pyrazolidone
1,4-dimethyl-3-pyrazolidone
4-methyl-3-pyrazolidone
4,4-dimethyl-3-pyrazolidone
1-phenyl-4,4-dimethyl-3-pyrazolidone
1-(3-chlorophenyl)-4-methyl-3-pyrazolidone
1-(4-chlorophenyl)-4-methyl-3-pyrazolidone
1-(3-chlorophenyl)-3-pyrazolidone
1-(4-chlorophenyl)-3-pyrazolidone
1-(4-tolyl)-4-methyl-3-pyrazolidone
1-(2-tolyl)-4-methyl-3-pyrazolidone
1-(4-tolyl)-3-pyrazolidone
1-(3-tolyl)-3-pyrazolidone
1-(3-tolyl)-4,4-dimethyl-3-pyrazolidone
1-(2-trifluoroethyl)-4,4-dimethyl-3-pyrazolidone
5-methyl-3-pyrazolidone.

The above compounds may be prepared by the processes described in British patent specifications 679,677 and 679,678 in which the "phenimines," which can be prepared by reacting acrylonitrile derivatives with the corresponding hydrazine compounds, are saponified so as to form 3-pyrazolidones. 3-pyrazolidones may also be prepared by the process described in British patent specification 703,669, in which the final products are obtained by direct condensation of esters of acrylic acid or its derivatives with hydrazines. This process is especially suitable for reactions with hydrazine itself. It yields 3-pyrazolidones of an oily consistency which can be obtained in the form of crystalline compounds by converting them into salts, e.g. hydrochlorides, sulfates or 1,5-naphthalene disulfonates. The preparation of 4,4-dialkyl-3-pyrazolidones has been described in U.S. Pat. No. 2,772,282. In the method described there, 2,2 - dialkyl-$\beta$-chloropropionic acid chlorides are reacted with hydrazines.

The 3-pyrazolidones may be used as free bases or in the form of their salts.

The light-sensitive layers contain at least one of the light-sensitive azides in quantities of from 0.1 to 1.5 g./m$^2$. and one or more image producing compounds in quantities of from 0.02 to 0.5 g./m.$^2$. This range of concentration has been found suitable, although concentrations outside this range may, of course, also be employed. The concentration depends mainly on the requirements of the particular reproduction process.

To produce the light-sensitive layer, azides and image producing compounds may be suspended or dissolved in solvents and mixed with a film-forming binding agent and thereafter applied to the layer support.

The usual natural or synthetic film-forming polymers are suitable as binding agents for the light-sensitive layer, e.g. proteins, especially gelatin, cellulose derivatives, especially cellulose ether, cellulose esters or carboxymethyl cellulose, alginic acid and its derivatives, starch ether or gallactomannane, polyvinyl alcohol, polyvinyl pyrrolidone, polyvinyl chloride, copolymers of vinyl chloride and vinyl acetate, polyvinyl acetate or completely or partly saponified polyvinyl acetate or copolymers of vinyl acetate, for example with olefins such as ethylene or propylene and copolymers of monomers of acrylic- or methacrylic acid or derivatives thereof such as esters, amides or nitriles, etc. The light-sensitive layers may be used as self-supporting layers or applied to a support. Suitable supports are e.g. paper, especially baryta-coated or polyolefine-coated, more particular polyethylene-coated paper and cellulose esters, e.g. cellulose triacetate, polyesters, especially those based on ethylene terephthalate, glass, etc.

The image receiving material advantageously consists of an image receiving layer applied to a suitable support. Substantially the same substances as those described above for the light-sensitive material are suitable as binding agent for the image receiving layer or as the layer support.

When choosing a binder for the light-sensitive layer and the image receiving layer, care should be taken to ensure that the layers will not stick at elevated temperature. These difficulties, however, are well known from other transfer processes, e.g. the silver salt diffusion process or heat development processes, and can easily be solved by making use of the experience gained in these known fields.

The image receiving layer contains compounds which should be insensitive, or as restricted as possible in their sensitivity, to visible light under the conditions of the process of the invention, and which react with the transferred image producing compounds to form colored products. Numerous compounds have been found suitable for this purpose. Chemically, these compounds belong to a wide variety of classes so that their systematic chemical classification is not possible However, suitable compounds or suitable combinations of an image producing compound arranged in the light-sensitive layer and of the reactant for the image-forming reaction in the image receiving layer can be sufficiently clearly defined by simple laboratory tests customarily employed in the art. Thus, for example, the two reactants must react when briefly heated for a few seconds to a temperature of between about 80 and 200° C. to form a stable dye. A second test must then be carried out to choose suitable image producing compounds. The purpose of this test is to show whether the image producing compound will react sufficiently rapidly with the light-sensitive azide or exposure to light, so that, when the mixture is heated after it has been exposed, it will not produce a colored compound with the reactant in the image receiving layer.

The following classes of compounds are examples of suitable comopunds in the image receiving layer for reaction with the image transferred from the light-sensitive layer.

(1) Heavy metal compounds, especially of metals of the Main Groups III to V and sub-Groups I, II of the Periodic System of Elements, e.g. compounds of the following heavy metals: cadmium, mercury, silver, gold, bismuth or thallium. Salts of these metals with long chained aliphatic, carboxylic acids are especially suitable, and the addition compound of bismuth nitrate with amines such as triethanolamine. It is found to be especially suitable to use silver compounds which are substantially insensitive to light under the conditions of the copying process according to the invention, e.g. the silver salts described in U.S. Pat. No. 3,330,663, i.e silver salts of aliphatic carboxylic acids having a thioether group or silver salts of long-chained fatty acids such as silver behenate, silver palmitate or silver stearate, etc. When the above-mentioned heavy metal compounds are used, the brown to black copies are obtained. The image consists of the particular metal and/or a reaction product of the transferred image producing compound.

(2) Leucophthalocyanines are also suitable for use as reactants for the reaction which produces the image dye.

Leucophthalocyanines which have not or could not be prepared from finished phthalocyanines are known as phthalocyanine precurosrs. This term is used, for example, in the article by B. R. A. Brooks, J. G. Burt, B. F. Skiles and M S Whelen, J Org. Chem. 24, p. 383 (1959). In the relevant chapter in Ullmanns Encyklopädie der Technischen Chemie, 3rd edition, volume 13, the term "phthalocyano-metal complexes" is used for the same type of materials for which in the present context the term "leucophthalocyanines" is used. The last mentioned expression is explained e.g. in U.S. Pat. No. 2,772,285 Although it refers there only to leuco copper phthalocyanine, it is also applicable analogously to the corresponding complexes with other metals which form phthalocyanines. Leucophthalocyanines according to this definition are colorless or only slightly colored products in which the phthalocyanine structure is already completely formed, and which can be converted into phthalocyanines by a reduction process. In this reduction process, constituents which the leucophthalocyanine molecule contains in addition to phthalocyanine may also be split off. Such leucophthalocyanines may be prepared e.g. by first preparing a phthalocyanine, e.g. a phthalocyanine which is free from metal or CuPc (Pc=phthalocyanine), NiPc, CoPc or ZnPc and then treating the phthalocyanine with additional ligands under oxidising conditions, or by heating a reaction mixture which is in itself suitable for the preparation of a phthalocyanine to a temperature slightly below that required for the preparation of the phthalocyanine, or by carrying out the reaction without the reduction potential required for formation of the phthalcyanine.

Leucophthalocyanines which contain metal are more suitable for this reaction because those which are free from metal are relatively unstable. The highly stable and only slightly colored leuco cobalt phthalocyanines are especially suitable.

Especially to be mentioned are the leuco cobalt phthalocyanines which are described in Angewandte Chemie, 68, p. 145 (1956), e.g. the phthalocyanine cobalt ethylene diamine complex. Instead of ethylene diamine, other diamines or polyamine may also be used as ligands, for example propylene diamine-(1,2), and -(1,3), monoethylpropylene diamine-(1,3), hydroxyethylethylene diamine, N-methyl-N-β-hydroxyethylpropylene diamine, N,N' - diethylene diamine, N,N - di(β-aminoethyl)-ethylene diamine, N,N'-di(β-aminoethyl)ethylene diamine or N,N-di-[β-(β-aminoethyl) - aminoethyl] - amine or also monoamines such as 3-(2-ethylhexyloxy)-propylamine-(1) or stearylamine. The solubility properties of the leuco-CoPc depend on the type of amine used in the molecule.

In addition to the image forming reactant, the image receiving layers may also contain other additives which advantageously affect the color tone, contrast and stability, etc. of the copy. Image reeciving layers of this type are already known and have been described e.g. in U.S. Pat. No. 3,335,006 and Belgian Pat. No. 609,057.

The usual sources of light used in reproduction work, such as mercury lamps, iodine quartz lamps or incandescent lamps may be used for exposing the light-sensitive layers according to the invention. The spectral sensitivity of the light-sensitive material depends on the nature of the azides used. Most organic azides are sensitive to ultraviolet light and partly also to blue light.

Transfer of the image producing compounds from the unexposed areas of the light-sensitive layers to the image receiving layer is carried out at elevated temperatures of between 80 and 200° C. Heating may be performed e.g. by passing the exposed light-sensitive layer in contact with the image receiving layer over hot plates or rollers or by irradiation with infra-red light. The suitable temperature and heating time depends, of course, on the nature of the image producing compound and can be determined by a few simple tests.

One special advantage of the light-sensitive system to be used according to the invention consisting of the organic azide and the image producing compound is that the system can be optically sensitized. This is not possible with the known materials, e.g. those described in U.S. patent specification 3,094,417.

Practically the same compounds which are used for the optical sensitization of silver halide emulsion layers may be used as sensitizers for the material according to the invention. That is to say, preferably cyanine dyes, merocyanines, oxonoles or rhodacyanines of many different types as described e.g. in the book by F. M. Hamer "The Cyanine Dyes and Related Compounds," 1964.

The nitrile substituted thioamide sensitizers or their homologous compounds such as the corresponding tetramethine compounds described in French Pat. No. 1,574,890 or U.S. application, Ser. No. 727,696 are also highly effective.

Triphenyl-substituted thiopyrylium compounds described in British Pat. No. 1,023,377 have also proved to be suitable.

The technique of sensitization is also similar to that employed in silver halide photography. The sensitizers are dissolved in a suitable solvent such as short-chained aliphatic alcohols or aqueous systems and added to the layers before they are cast. The concentration of the optical sensitizers may vary within wide limits. Quantities of between 1 and 10 g. per mol of azide compounds have generally been found to be sufficient.

The most suitable sensitizers for a given system can easily be determined by the usual sensitometric tests customarily employed in the art of sensitizing silver halide emulsions.

The addition of sensitizers results not only in an increase in optical sensitivity but also in a considerable increase in speed which is especially desirable for achieving short copying times. Due to the possibility of sensitizing the layers according to the invention to the red and green regions of the spectrum as well, it is not only possible to obtain perfect copies of colored originals but also, by suitable choice of the image producing systems which yield dyes in the subtractive color components, to obtain copies with natural colors.

EXAMPLE 1

Light-sensitive material

A solution of 50 mg. of azide 35 (Table 1) and 15 mg. of 1-phenyl-3-pyrazolidone as the image producing compound in 10 ml. of methyl ethyl ketone mixed with 5 ml. of a 5% ethyl cellulose solution in methyl ethyl ketone is cast on a paper support and dried.

Image receiving material 25 mg. of a leuco-cobalt-phthalocyanine stearylamine complex prepared by the method described below are dissolved in 40 g. of a 1.5% polyvinyl acetate solution in acetone and 26 g. of a 4% cellulose acetate solution in acetone, cast on paper and dried.

Processing

The light-sensitive layer is exposed through an original to a 75 watt mercury lamp at a distance of 20 cm. for 5 minutes and then heated to a temperature of between 80° and 140° C. in contact with the image receiving material. A blue positive of the original is obtained.

The leuco-CoPc used is prepared as follows: 50 g. of a starting material prepared according to German Pat. No. 855,710, Example 1, were converted into the nitrate by treatment with concentrated nitric acid as described in German Pat. No. 839,939. 16 g. of the dry nitrate were boiled in 50 ml. of cleaning petrol with 15 g. of stearylamine for 20 minutes, the mixture was diluted with 750 ml. of cleaning petrol, the resulting solution was filtered at 100° C. and stirred at room temperature for several hours. The crystallized product was suction-filtered and dried. The reaction product, of which 27 g. were obtained, was dissolved in boiling ethanol, the solution was stirred at room temperature and the crystallisate was suction-filtered and dried. 12 g. of an orange colored material were obtained.

EXAMPLE 2

Light-sensitive material

A light-sensitive layer is prepared from a solution of:

250 mg. of azide 14,
50 mg. of 1-phenyl-3-pyrazolidone,
10 ml. of methyl ethyl ketone, and
5 ml. of a 10% solution of polyvinyl chloride in methyl ethyl ketone by casting the solution on a paper support and drying.

Image-receiving material 1 g. of bismuth nitrate is shaken in a vibratory mill for 6 hours with 40 g. of a 1.5% solution of polyvinyl acetate in acetone and
26 g. of a 4% solution of acetyl cellulose in acetone.

The mixture is cast on a paper support and dried.

Processing

The treatment is carried out as described in Example 1 but exposure is carried out for 3 minutes. A yellow-brown positive is obtained. Instead of bismuth nitrate in the image receiving layer, 0.6 g. of thallium (I) chloride or 0.8 g. of mercury (II) bromide may be used with equally good results.

EXAMPLE 3

Light-sensitive material

A light-sensitive layer is prepared from a solution of:

30 mg. of azide 27,
15 mg. of 1-phenyl-3-pyrazolidone,
10 ml. of methyl ethyl ketone and
5 ml. of a 10% solution of polyvinyl chloride in methyl ethyl ketone by casting the solution on a paper support and drying.

Image receiving material 2.1 g. of a mixture of siver behenate and behenic acid in the molar ratio of 1:1 are ground in a vibratory mill for 6 hours with 80 g. of a 1.5% solution of polyvinyl acetate in acetone and 52 g. of a 4% solution of acetyl cellulose in the same solvent. The mixture is cast on a paper support and dried.

Processing

The treatment is the same as described in Example 1 but exposure is for 2 minutes. A brown positive is obtained. Instead of azide 27, other azides can be used with similar results.

EXAMPLE 4

Light sensitive material

A light-sensitive layer is prepared from 30 m. of an azide,
5 mg. of an image producing compound,
10 ml. of methyl ethyl ketone, and
5 ml. of a 10% solution of polyvinyl chloride in methyl ethyl ketone.

The following are examples of combinations of organic azido compounds with compounds of the pyrazolidone-3 series, which were used:

| Azide: | Image producing compound |
|---|---|
| 11 | 1-phenyl-3-pyrazolidone. |
| 14 | 1-phenyl-3-pyrazolidone. |
| 14 | 5-methyl-3-pyrazolidone. |
| 9 | 1-phenyl-3-pyrazolidone. |
| 21 | 1-phenyl-3-pyrazolidone. |
| 13 | 1-phenyl-3-pyrazolidone. |
| 16 | 1-phenyl-3-pyrazolidone. |
| 39 | 1-phenyl-3-pyrazolidone. |
| 26 | 1-phenyl-3-pyrazolidone. |
| 27 | 1-phenyl-3-pyrazolidone. |
| 14 | 1-phenyl-4,4-dimethyl-3-pyrazolidone. |
| 14 | 1-[2-trifluoroethyl]-4,4-dimethyl-3-pyrazolidone. |
| 14 | 1-phenyl-4-methyl-3-pyrazolidone. |
| 38 | 1-phenyl-3-pyrazolidone. |
| 3 | 1-phenyl-3-pyrazolidone. |
| 5 | 1-phenyl-3-pyrazolidone. |
| 15 | 1-phenyl-3-pyrazolidone. |
| 12 | 1-phenyl-3-pyrazolidone. |
| 19 | 1-phenyl-3-pyrazolidone. |

| | |
|---|---|
| 10 | 1-phenyl-3-pyrazolidone. |
| 29 | 1-phenyl-3-pyrazolidone. |
| 30 | 1-phenyl-3-pyrazolidone. |
| 2 | 1-phenyl-3-pyrazolidone. |

Image receiving material

An image receiving layer is prepared as described in Example 1 but with the addition of 0.9 g. of 1-oxo-1,2-dihydrophthalazine, 8.4 g. of zinc oxide and 1.4 g. of coumarone indene resin.

Processing

The light-sensitive layer is exposed as described in Example 1 with a mercury vapour lamp or, in the case of layers which contain azides which absorb light of longer wavelengths (e.g. azides 14, 20 and 35, etc.), sources of light which emit longer waves, e.g. iodine quartz lamps, may also be used. After the transfer at 130° C. from brown to black copies, which have a higher covering power than those obtained with the image receiving layers described in Example 3 are obtained in all cases.

Instead of silver behenate used in this case, other silver compounds may also be used, e.g. silver stearate or silver salts of octadecylmercapto acetic acid or 2-octadecylmercapto-5-carboxymethylmercapto-1,3,4-thiadiazole (as described in U.S. Pat. No. 3,330,663), etc. The choice of suitable compounds depends on the purpose for which they are to be used and the desired image tone.

EXAMPLE 5

The sensitizers shown in the following table are added to a mixture prepared from 30 mg. of azide 14,
5 mg. of 1-phenyl-4-methyl-3-pyrazolidone,
10 ml. of methyl ethyl ketone, and
5 ml. of a 10% polyvinyl chloride solution in methyl ethyl ketone and the mixture is cast on a paper support and dried.

The layer is exposed behind a $\sqrt{2}$ step wedge to a 650 watt iodine quartz lamp for 60 seconds and then transferred at a temperature of 130° C. as described in Example 4. The step wedges of the samples obtained in this way under the same conditions, indicate by the higher number of visible steps compared with those found in an unsensitized control sample, the increase in sensitivity obtained by the addition of sensitizer. A few results are shown below:

| | Sensitizer | Step number |
|---|---|---|
| 1 | Control sample | 3 |
| 2 | 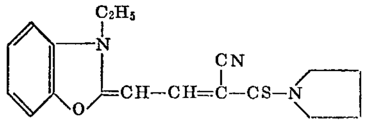 | 9 |
| 3 | 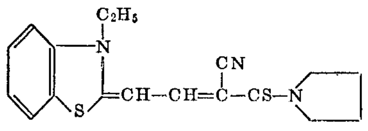 | 7 |
| 4 | 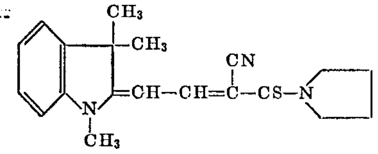 | 11 |
| 5 | 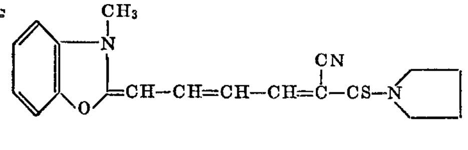 | 12 |

TABLE—Continued
| | Sensitizer | Step number |
|---|---|---|
| 6 | 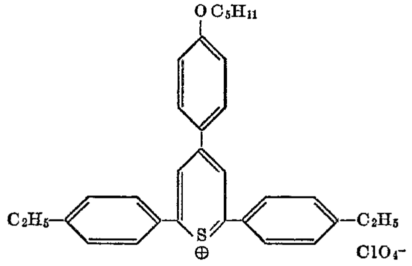 | 7 |
| 7 | 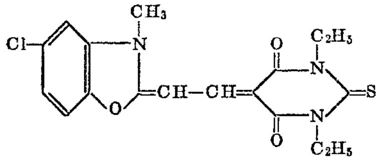 | 6 |
| 8 | 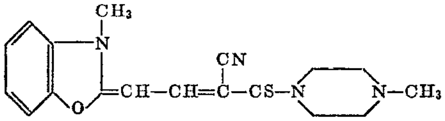 | 7 |
| 9 | 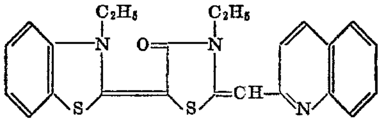 | 8 |
| 10 | 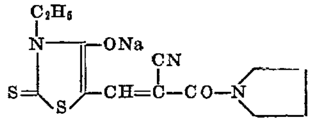 | 6 |
| 11 | 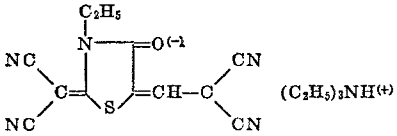 | 7 |
| 12 | 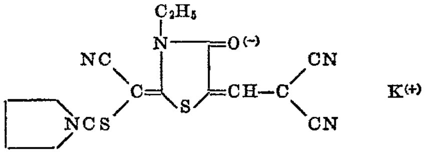 | 5 |
| 13 | 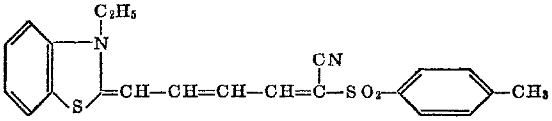 | 6 |
| 14 | 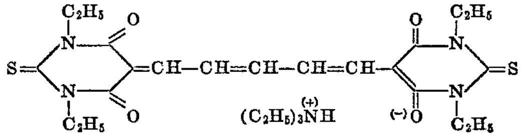 | 6 |
| 15 | 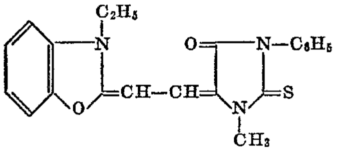 | 5 |

By exposing a graded interference filter (Schott Veril S–200) to light, spectral sensitivity curves are obtained, the characteristics of which are shown in the following examples:

| Sensitizer | Sensitivity range, nm. | Sensitivity maximum, nm. |
|---|---|---|
| 2 | 410–520 | 480 |
| 3 | 420–560 | 500 |
| 5 | 480–600 | 550 |

The above sensitizers are prepared by methods known from the literature.

We claim:

1. In a process for making copies by imagewise exposure of a light-sensitive layer which contains a light-sensitive compound and an image producing compound which can be transferred upon heating to an image receiving layer, the image producing compound in the exposed areas being converted into a non-transferable compound upon reaction with the light-sensitive compound, bringing the exposed layer into contact with an image receiving layer which contains compounds capable of reacting with the image producing compound to form colored reaction products, and heating the layers while in contact to a temperature at which the image producing compound is transferred from the unexposed areas of the light-sensitive layer to the image receiving layer, the improvement consisting of exposing a light-sensitive layer which contains as the light-sensitive compound an organic azido compound selected from the group consisting of light-sensitive aryl azides and heterocyclic azides containing at least one azido group attached to the aromatic ring directly or through a carbonyl or sulfonyl group and as the image producing transferable compound a compound of the 3-pyrazolidone series which is transferable at a temperature of between 80 and 200° C.

2. The process of claim 1, wherein the organic azido compound has the formula:

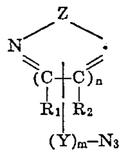

wherein

- Z=the ring members necessary for completing an oxazole, thiazole, selenazole, imidazole, pyridine, pyrrole or pyrimidine ring, which ring may contain a fused benzene or naphthalene ring;
- Y=phenylene, phenylene carbonyl methylene;
- $R_1$ or $R_2$=hydrogen, a saturated or olefinically unsaturated aliphatic group having up to 5 carbon atoms, a phenyl group, amino, halogen, hydroxy, alkoxy, carboxyl, esterified carboxyl, carbamoyl, sulfo, sulfonamido or nitril;
- $R_1$ and $R_2$ together may represent the ring members necessary for completing a fused benzene or naphthalene ring;
- $n$=0 or 1 and
- $m$=0 or 1.

3. The process of claim 2, wherein the organic azido compound is a compound of the 9-azido acridine, 9-azido-2,3-benzoacridine or 4-azidoquinoline series.

4. The process of claim 1, wherein the image producing compound is a 3-pyrazolidone of the following formula:

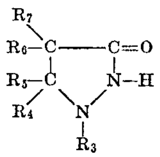

in which:

- $R_3$=hydrogen, or alkyl or aryl; and
- $R_4$, $R_5$, $R_6$ and $R_7$=hydrogen or alkyl or aryl.

5. The process of claim 1, wherein the image producing compound is a 3-pyrazolidone in which $R_3$ is a substituent of the phenyl series.

6. The process of claim 1, wherein the light-sensitive layer contains compounds which optically sensitize the system of organic azido compound and image producing compound.

7. The process of claim 6, wherein the light-sensitive layer contains a polymethine sensitizer or a merocyanine.

8. The process of claim 7, wherein the light-sensitive layer contains a merocyanine.

9. The process of claim 1, wherein the image receiving layer contains a heavy metal compound which is not light-sensitive under the conditions of the process.

10. The process of claim 9, wherein the image receiving layer contains a silver compound which is insensitive or only slightly sensitive towards light under the conditions of the process.

11. The process of claim 10, wherein the image receiving layer contains the silver salts of a long-chained aliphatic carboxylic acid containing 8 to 24 carbon atoms.

12. The process of claim 10, wherein the image receiving layer contains a silver salt of an aliphatic carboxylic acid which is substituted with a thioether group.

13. Light-sensitive photographic material having a light-sensitive layer which contains a light-sensitive organic azido compound selected from the group consisting of light-sentive aryl azides and heterocyclic azides containing at least one azido group attached to the aromatic ring directly or through a carbonyl or sulfonyl group and in addition, as an image producing compound which is transferable at a temperature of between 80 and 200° C., a compound of the 3-pyrazolidone series.

14. The material of claim 13, wherein the organic azido compound has the formula

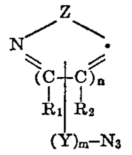

wherein

- Z=the ring members necessary for completing an oxazole, thiazole, selenazole, imidazole, pyrimidine, pyrrole or pyrimidine ring, which ring may contain a fused benzene or naphthalene ring;
- Y=phenylene, phenylene carbonyl methylene;
- $R_1$ or $R_2$=hydrogen, a saturate or olefinically unsaturated aliphatic group having up to 5 carbon atoms, a phenyl group, amino, halogen, hydroxy, alkoxy, carboxyl, esterified carboxyl, carbamoyl, sulfo, sulfonamido or nitril;
- $R_1$ and $R_2$ together may represent the ring members necessary for completing a fused benzene or naphthalene ring;
- $n$=0 or 1 and
- $m$=0 or 1.

15. The material of claim 13, wherein the light-sensitive azido compound is a compound of the 9-azidoacridine, 9-azido-2,3-benzoacridine or 4-azidoquinoline series.

16. Light-sensitive material of claim 13, wherein the image producing compound is a 3-pyrazolidone of the following formula:

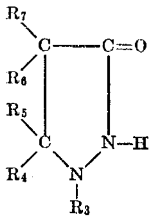

in which $R_3$=hydrogen, alkyl or aryl; and $R_4$, $R_5$, $R_6$ and $R_7$=hydrogen, alkyl or aryl.

17. Light-sensitive material of claim 13, wherein the image producing compound is a 3-pyrazolidone in which $R_3$ represents a radical of the phenyl series.

18. Light-sensitive material of claim 13, wherein the light-senstive layer contains a compound which optically sensitizes the system of light-sensitive azido compound and image producing compound.

19. Light-sensitive material of claim 18, wherein the light-sensitive layer contains a polymethine dye or a merocyanine as a sensitizer.

20. Light-sensitive material of claim 19, wherein the light-sensitive layer contains a merocyanine.

References Cited

UNITED STATES PATENTS

| | | | |
|---|---|---|---|
| 3,348,945 | 10/1967 | Mader | 96—29 |
| 3,062,650 | 11/1962 | Sagura et al. | 96—91 N |
| 2,882,151 | 4/1959 | Yutzy et al. | 96—49 X |
| 2,747,999 | 5/1956 | Yutzy | 95—88 |
| 3,282,693 | 11/1966 | Sugura | 96—49 |

NORMAN G. TORCHIN, Primary Examiner

J. L. GOODROW, Assistant Examiner

U.S. Cl. X.R.

96—91 N